(12) United States Patent
Wang et al.

(10) Patent No.: US 7,328,324 B2
(45) Date of Patent: Feb. 5, 2008

(54) MULTIPLE MODE CONTROLLER METHOD AND APPARATUS

(75) Inventors: Yuanru Frank Wang, Broomfield, CO (US); Paul Andrew Ashmore, Longmont, CO (US)

(73) Assignee: Dot Hill Systems Corp.

( * ) Notice: Subject to any disclaimer, the term of this patent is extended or adjusted under 35 U.S.C. 154(b) by 256 days.

(21) Appl. No.: 11/116,888

(22) Filed: Apr. 27, 2005

(65) Prior Publication Data
US 2006/0248308 A1    Nov. 2, 2006

(51) Int. Cl.
G06F 12/00 (2006.01)
(52) U.S. Cl. .............. 711/173; 711/114; 711/129; 711/154; 714/5; 714/9
(58) Field of Classification Search ............... 711/114, 711/129, 173, 154; 714/5, 9
See application file for complete search history.

(56) References Cited

U.S. PATENT DOCUMENTS

| | | | |
|---|---|---|---|
| 5,761,705 A | * | 6/1998 | DeKoning et al. .......... 711/113 |
| 6,148,368 A | * | 11/2000 | DeKoning ................... 711/113 |
| 6,766,491 B2 | | 7/2004 | Busser |
| 6,839,788 B2 | | 1/2005 | Pecone |
| 7,107,320 B2 | * | 9/2006 | Busser et al. ............... 709/213 |

* cited by examiner

Primary Examiner—Stephen C. Elmore
(74) Attorney, Agent, or Firm—Sheridan Ross P.C.

(57) ABSTRACT

A data storage system configured for efficient operation in a single controller mode and to facilitate an upgrade from single controller operation to dual redundant active-active controller operation is provided. More particularly, a first controller having a segmented write cache is provided. The first segment of the write cache is associated with logical unit numbers (LUNs) owned by the first controller. The second segment is associated with LUNs that are designated as being owned by a second controller. During single controller operation, the segments of the write cache operate as primary write cache. The system may be converted to dual redundant controller operation by adding a second controller having a write cache segmented like the write cache of the first controller. Upon adding a second controller, primary control of the LUNs owned by or zoned to the second controller is taken over by the second controller.

25 Claims, 5 Drawing Sheets

MULTIPLE MODE CONTROLLER METHOD AND APPARATUS

FIELD OF THE INVENTION

The present invention is directed to a data storage system controller. In particular, the present invention is directed to providing a controller that can convert from single controller operation to dual redundant controller operation without significantly interrupting storage system operation.

BACKGROUND OF THE INVENTION

The need to store digital files, documents, pictures, images and other data continues to increase rapidly. In connection with the electronic storage of data, systems incorporating more than one storage device have been devised. In general, using a number of storage devices in a coordinated fashion in order to store data can increase the total storage volume of the system. In addition, data can be distributed across the multiple storage devices such that data will not be irretrievably lost if one of the storage devices (or in some case more than one storage device) fails. An additional advantage that can be achieved by coordinating operation of a number of individual storage devices is improved data access and/or storage times. Examples of systems that can provide such advantages can be found in the various RAID (redundant array of independent disks) levels that have been developed.

High availability is a key concern because in many applications users rely heavily on the data stored on the RAID system. In these types of applications, unavailability of data stored on the RAID system can result in significant loss of revenue and/or customer satisfaction. Employing a RAID system in such an application enhances availability of the stored data, since if a single disk drive fails, data may still be stored and retrieved from the system. In addition to the use of a RAID system, it is common to use redundant RAID controllers to further enhance the availability of such a storage system. In such a situation, two or more controllers are used such that, if one of the controllers fails, the remaining controller will assume operations for the failed controller. The availability of the storage system is therefore enhanced, because the system can sustain a failure of a controller and continue to operate. When using dual controllers, each controller may conduct independent read and write operations simultaneously. This is known as an active-active configuration. In an active-active configuration, write-back data and associated parity data are mirrored between the controllers.

In a system using two controllers, data sent from the host to be written to the disk array is typically sent to either the first active controller or the second active controller. Where the data is sent depends upon the location in the disk array to which the data will be written. In active-active systems, typically one controller is zoned to a specific array of drives or a specific area, such as a partition or logical unit number (LUN). Thus, if data is to be written to the array or array partition that the first active controller is zoned to, the data is sent to the first active controller. Likewise, if the data is to be written to an array or array partition that the second active controller is zoned to, the data is sent to the second active controller. In order to maintain redundancy between the two controllers, the data sent to the first active controller must be copied on to the second active controller. Likewise, the data sent to the second active controller must be copied onto the first active controller.

When a controller in an active-active controller pair suffers a failure, the other active controller recognizes the failure and takes control of the write operations of the first controller. This may include the surviving controller determining whether the failed controller had data writes outstanding. If data writes are outstanding, the surviving controller issues a command to write the new data and parity to the target array or array partition. Furthermore, following the failure of a controller, the surviving controller can perform new write operations that would normally have been handled by the failed controller.

In order to provide high input/output (IO) performance, a typical RAID controller has a large cache, often in the range of gigabytes, such as 1, 2, 4, 8 or 20 gigabytes. Typically, half of the cache is dedicated as read cache, and the other half is dedicated as write cache. For a redundant controller implantation where dual controllers exist in a storage system, half of the write cache is used as write back cache for LUNs/arrays owned by the local controller, and the other half is used to mirror the cache data from the partner controller.

Because of the advantages of providing redundant controllers, data storage systems often provide two slots for receiving controllers, such as RAID controllers. If a user desires, the data storage system can be operated using only a single controller, for example if cost constraints prevent or dissuade the user from provisioning the data storage system with two controllers. The data storage system may then be upgraded to dual redundant controller operation by adding a second controller at a later time. However, upgrading a system originally deployed as a single controller system to operate using two controllers, thereby providing redundant controller operation, typically requires that the storage system be taken off line. In particular, in a single controller system, all of the data storage devices are created and owned by (or zoned to) that controller. When a new controller is inserted into the system, all of the storage devices remain owned by the original controller. Accordingly, only newly created or added devices may be owned by (or zoned to) the second controller.

In particular, in a standalone configuration, a single controller is running in the data storage system. In such a controller, the cache is segmented, half for read and half for write operations. In a standalone controller system, there is no need or place to mirror the data. Therefore, the entire write cache of the single controller is allocated as write back cache for the LUNs/arrays owned by the controller. If a second controller is added to a single controller system, the original controller is unable to mirror the data from the newly inserted controller, because all of the write cache of the original controller has been allocated to write operations involving the LUNs/arrays owned by that controller. As a result, in order to enable active-active redundant controller operation, the original controller must go through a shut down and reboot operation to flush the cache data in order to re-segment the cache into a write-back region that includes a primary write-back region and a mirror write-back region. This process disrupts the normal system operation and may not be acceptable in certain applications, such as video streaming.

SUMMARY OF THE INVENTION

The present invention is directed to solving these and other problems and disadvantages of the prior art. In accordance with embodiments of the present invention, a data storage system controller capable of converting from single controller operation to dual redundant active-active controller operation with automatic load balancing while maintaining high performance is provided. Furthermore, even when used in a single controller configuration, the entire cache of the controller is operable. Accordingly, embodiments of the present invention facilitate the efficient use of controller memory while operated in a single controller mode, and permit a conversion from single controller to dual controller operation, without requiring that an array be taken offline.

In accordance with embodiments of the present invention, memory provided as part of a storage system controller is partitioned into a write cache and a separate read cache. In addition, the write cache is segmented into first and second segments. The segments of the write cache may each occupy the same amount of memory. When operated in a single controller mode, the first and second segments of a controller's write cache serve as primary write-back cache. However, the first and second segments are associated with or are zoned to different arrays and/or array partitions (hereinafter referred to as logical unit numbers or LUNs). When operated in a dual redundant active-active controller mode (hereinafter referred to simply as a dual controller mode), the first and second segments of each controller operate as primary write-back cache and mirror write-back cache respectively. Furthermore, in a dual controller mode, data handled by the primary write-back cache is associated with arrays and/or array partitions owned by the respective controller and is directed to the controller having primary responsibility by the host providing the data. Data handled by the mirror write-back cache of a controller operating in a dual controller mode is associated with arrays and/or array partitions owned by the other controller, and is provided to the controller by the other controller as part of a mirror operation. In accordance with embodiments of the present invention, the storage system is associated with a number of storage devices on which a number of arrays and/or array partitions (or logical unit numbers (LUNs)) are established.

In accordance with further embodiments of the present invention, a method for configuring a data storage system such that the storage system may initially be operated in single controller mode and may later be upgraded to dual controller mode, without requiring that the storage system be rebooted, is provided. In accordance with such embodiments, the write-back cache region of the original controller is segmented into two equally sized segments or regions. A first of these regions is assigned or zoned to a first LUN or set of LUNs. The second segment or region is assigned or zoned to a second LUN or set of LUNs. In accordance with further embodiments of the present invention, the zoning of the write-back cache regions may be controlled such that the load handled by the regions is balanced. While the controller is operating in a single controller mode, all of the write cache is available. If the controller is later converted to a dual controller mode, all of the write cache continues to be available, but the second segment is used for mirrored data, while the first segment continues to be used for primary sets of data. As used herein, a mirrored copy of data is data provided by a partner controller, while a primary set of data is data that has not been provided by any partner controller.

According to embodiments of the present invention, in order to convert a data storage system from a single controller mode to a dual controller mode, a second controller, having memory segmented and partitioned as in the first controller, is added to the system. Host operations are temporarily suspended, and all of the write cache data contained in the first controller is copied to the write cache of the second controller. Ownership of the arrays and array partitions that previously were associated with the second segment or region of the write-back cache of the first controller is transferred to one segment or region of the write-back cache of the second controller. In accordance with embodiments of the present invention, when those arrays and/or array partitions were associated with the second segment or region of the write-back cache of the first controller, metadata indicating that such arrays and/or array partitions were actually owned by another controller will have been created. Accordingly, embodiments of the present invention permit a second controller to be added to a data storage system as a reverse failover operation, in which control of LUNs owned by the second controller are transferred from the first controller to the second controller. Furthermore, by adding the second controller, the system recognizes that the path used for data addressed to LUNs controlled by the second controller has changed, and therefore such data will actually be directed to the second controller, rather than to the first controller as occurs during single controller operation. In addition, during normal (non-failover) single controller operation, the single controller does not send a failover condition signal to the host, even though it is operating as the primary controller for both write operations involving LUNs that are owned by that controller, and LUNs owned by another controller according to the associated metadata. Accordingly, the host operations can be resumed, without requiring alterations to the host or a need to flush the cache of the original controller.

DETAILED DESCRIPTION

Figure 1:
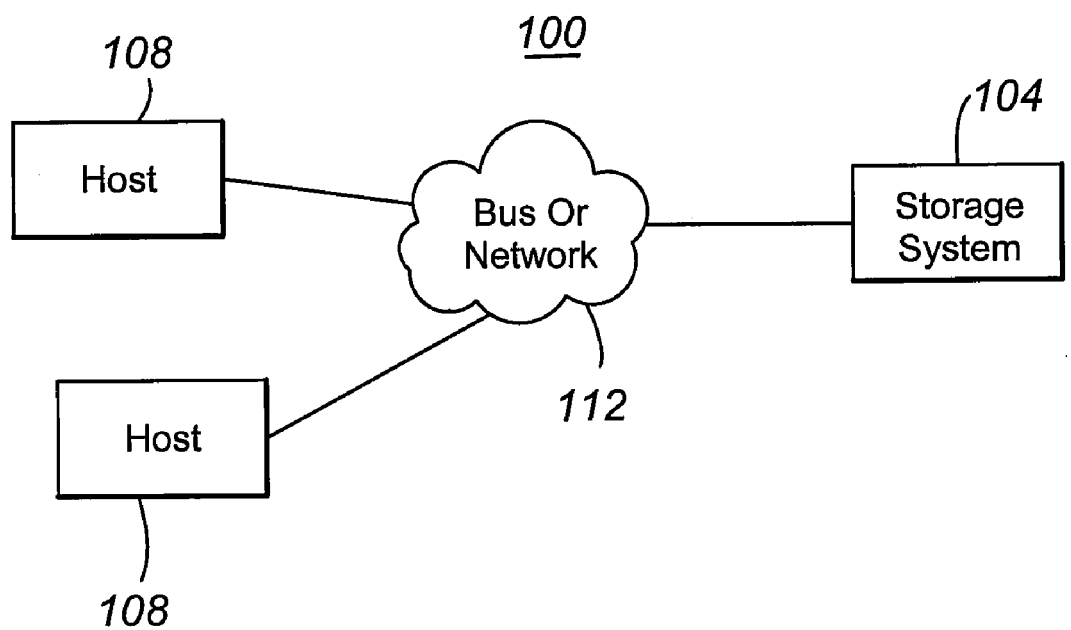
FIG. 1 is a block diagram depicting an electronic data system incorporating a data storage system in accordance with embodiments of the present invention.

FIG. 1 is a block diagram depicting an electronic data system 100 incorporating a data storage system 104 in accordance with embodiments of the present invention. In general, the data storage system 104 may be interconnected to one or more host processors or computers 108 by a bus and/or network 112. Accordingly, embodiments of the present invention have applications in association with single or multiple hosts 108 in storage area network (SAN) or direct connect environments.

Figure 2:
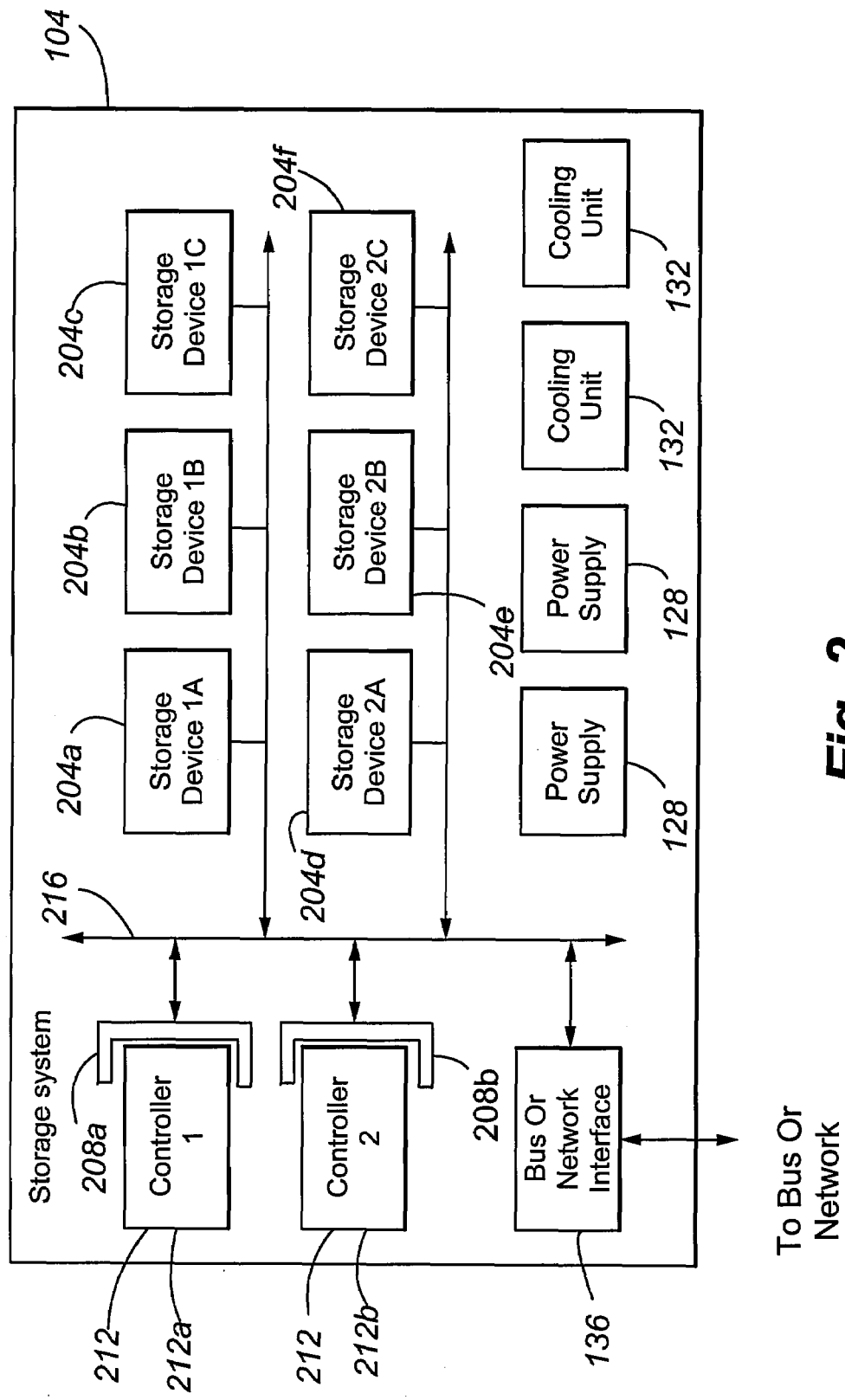
FIG. 2 is a block diagram depicting a data storage system in accordance with embodiments of the present invention.

With reference now to FIG. 2, components that may be included in a data storage system 104 in accordance with embodiments of the present invention are illustrated. In general, the data storage system 104 includes a number of storage devices 204a-f. Examples of storage devices 204 include hard disk drives, such as serial advanced technology attachment (SATA), small computer system interface (SCSI), serial attached SCSI (SAS), fiber channel (FC) or parallel advanced technology attachment (PATA) hard disk drives. Other examples of storage devices 204 include magnetic tape storage devices, optical storage devices or solid state disk devices. Furthermore, although a number of storage devices 204 are illustrated, it should be appreciated embodiments of the present invention are not limited to any particular number of storage devices, and that a lesser or greater number of storage devices 204 may be provided as part of a data storage system 104. As can be appreciated by one of skill in the art, arrays and/or array partitions, hereinafter referred to as logical unit numbers (LUNs) may be established on the data storage devices 204. As can further be appreciated by one of skill in the art, a LUN may be implemented in accordance with any one of the various RAID array levels or other arrangements for storing data on one or more storage devices 204.

A data storage system 104 in accordance with embodiments of the present invention may be provided with a first controller slot 208a and a second controller slot 208b. As can be appreciated by one of skill in the art, a controller slot 208 may comprise a connection or set of connections to enable a controller 212 to be operably interconnected to other components of the data storage system 104. Furthermore, a data storage system 104 in accordance with embodiments of the present invention includes at least one controller 212a. For example while the data storage system 104 is operated in a single controller, non-failover mode, the data storage system 104 may include exactly one controller 212. A data storage system 104 may also be operated in a dual redundant active-active controller mode (hereinafter simply referred to as a dual controller mode) by providing a second controller 212b. When a second controller 212b is used in addition to a first controller 212a, the second controller 212b is received by the second controller slot 208b. As can be appreciated by one of skill in the art, the provision of two controllers 212a-b permits data to be mirrored between the controllers 212a-b, providing redundant active-active controller operation. Furthermore, a data storage system 104 in accordance with embodiments of the present invention can be converted from a single controller mode of operation to a dual controller mode of operation without requiring that the original controller be rebooted or have its cache flushed. As can also be appreciated by one of skill in the art, the controller slots 208 may be configured such that a controller 212 may be removed from or added to the data storage system 104 relatively easily, to facilitate upgrade and/or maintenance operations. For example, the controller slots 208 may facilitate the provision of a controller 212 as a field replaceable unit (FRU) that can be added to the data storage system 104 or replaced as part of a plug-in type operation.

One or more buses or channels 216 are generally provided to interconnect with a controller or controllers 212a-b, through the associated controller slot or slots 208a-b, to the storage devices 204. Furthermore, while illustrated as a single shared bus or channel 216, it can be appreciated that a number of dedicated and/or shared buses or channels may be provided.

Additional components that may be included in a data storage system 104 include one or more power supplies 128 and one or more cooling units 132. In addition, a bus or network interface 136 may be provided to interconnect the data storage system 104 to the bus or network 112.

Figure 3:
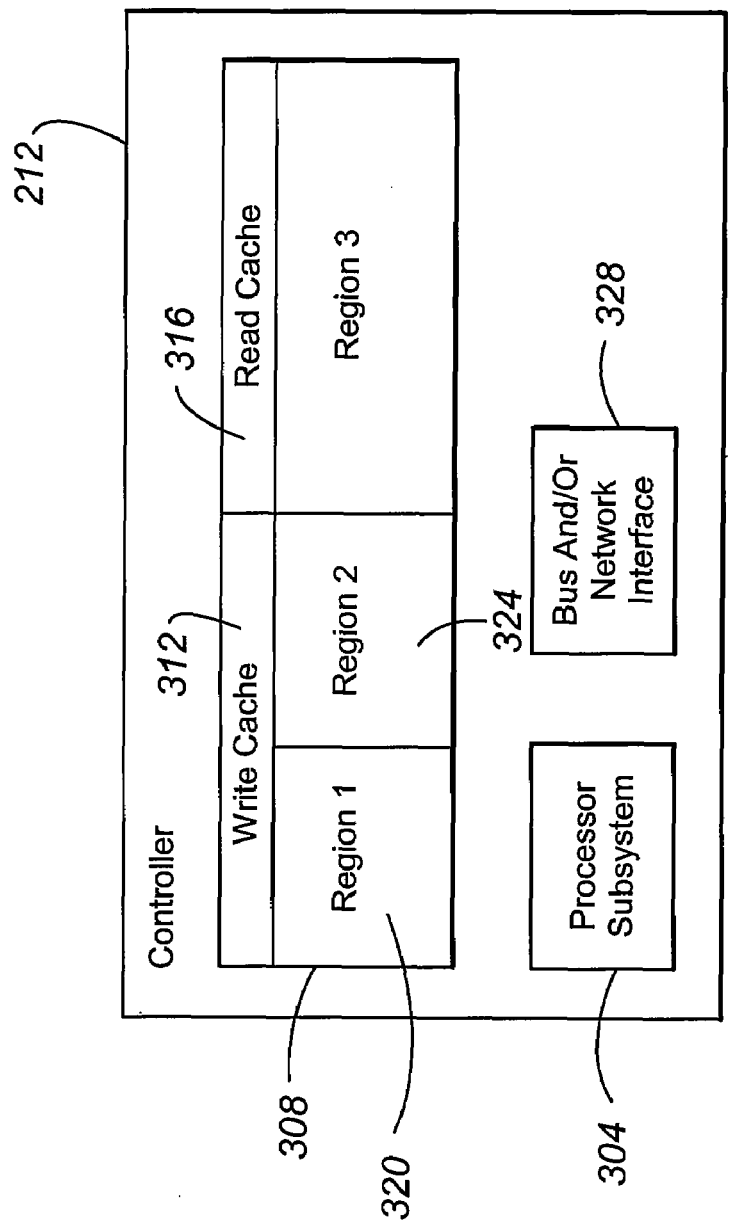
FIG. 3 is a block diagram depicting aspects of a controller in accordance with embodiments of the present invention.

With reference now to FIG. 3, aspects of a controller 212 in accordance with embodiments of the present invention are illustrated. In general, a controller 212 includes a processor subsystem 304 capable of executing instructions for performing, implementing and/or controlling various controller 212 functions. Such instructions may be stored as software and/or firmware. Furthermore, instructions carried out by the processor subsystem 304 may comprise the operation of hardwired logic. For example, operations of a controller 212 related to providing a failover signal when another controller 212 in a dual controller data storage system 104 has failed, or suppressing a failover signal when the controller 212 is being operated as a single controller in a data storage system 104 capable of dual controller operation, may be performed by executing instructions stored in software or firmware. As a further example, operations concerning the generation of parity data may be performed using hardwired logic circuits provided as part of the processor subsystem 304. Accordingly, the processor subsystem 304 may be implemented as a number of discrete components, such as one or more programmable processors in combination with one or more hardwired logic circuits. The processor subsystem 304 may also include or be implemented as one or more integrated devices.

A controller 212 also generally includes memory 308. The memory 308 is divided or partitioned into at least first and second partitions comprising a write cache 312 and a read cache 316. As can be appreciated by one of skill in the art, by providing caches 312, 316, a controller can improve the speed of input/output (IO) operations between a host 108 and the data storage devices 204 comprising an array or array partition. As can further be appreciated by one of skill in the art, a controller 308 typically reports to the relevant host 108 that a write operation has been completed after data associated with that operation has been written to the write cache 312. As can also be appreciated by one of skill in the art, the indication that a write operation has been completed will generally be given to the host even though data has not yet been successfully written to a data storage device or devices 204. Therefore, while providing this early indication of the completion of a write is advantageous in that it allows the host 108 to discard the data provided as part of the write operation, improving overall data system 100 performance, it risks the loss of that data should the controller 212, the target device or devices 204, the bus or channel 216 interconnecting the controller 212 to the source device or devices 204, or some other component or operation fail. For this reason, it is often considered desirable to provide dual redundant controllers 212 in which data comprising a write operation being primarily handled by one controller 212 is mirrored to a partner controller 212. The memory 304 is not specifically limited to memory of any particular type. For example, the memory 308 may comprise a solid state memory device. As a further example, the memory 308 may comprise a number of solid state memory devices.

In order to support the mirroring of data, the write cache 312 is segmented into first and second segments 320 and 324. One segment 320 is used to cache write operations that the controller 212 is primarily responsible for (i.e., write operations involving LUNs owned by the subject controller 212). The second segment (e.g., segment 324) is, according to embodiments of the present invention, used as a cache for data involving write operations associated with LUNs that are not owned by or zoned to the subject controller 212. That is, the second segment 324 of the write cache 312 may be used in connection with LUNs that are separable from those directed to LUNs associated with the first segment 320. Furthermore, the second segment 324 of the write cache 308 may operate as additional memory available as a primary data write cache (i.e., a cache for write data not received from any other controller 212) when the controller 212 is the only controller in a data storage system 104. The second segment 324 may be used as a write cache for data mirrored from a partner controller 212 when the subject controller 212 is associated with a data storage system 104 operating in a dual controller mode.

In accordance with embodiments of the present invention, the regions of memory 308 comprising the segments 320 and 324 of the write cache 312, and the read cache 316, must be configured such that those regions are the same size as the regions in memory 308 of a partner controller 212, in order to provide balanced performance in a dual controller operating mode. In addition, it can be appreciated that the segments 320, 324 should preferably be identical in capacity and should have identical associated memory addresses as the partner controller 212, in order to facilitate switching between single and dual controller modes in a data storage system 104.

A controller 212 may additionally include other components. For example, a bus and/or network interface 328 may be provided for operably interconnecting the controller 212 to the remainder of the data storage system 104, for example through a controller slot 208 and a bus or channel 216. Furthermore, the interface 328 may be configured to facilitate removal or replacement of the controller 212 in a controller slot 208 as a field replaceable unit (FRU).

Figure 4A:
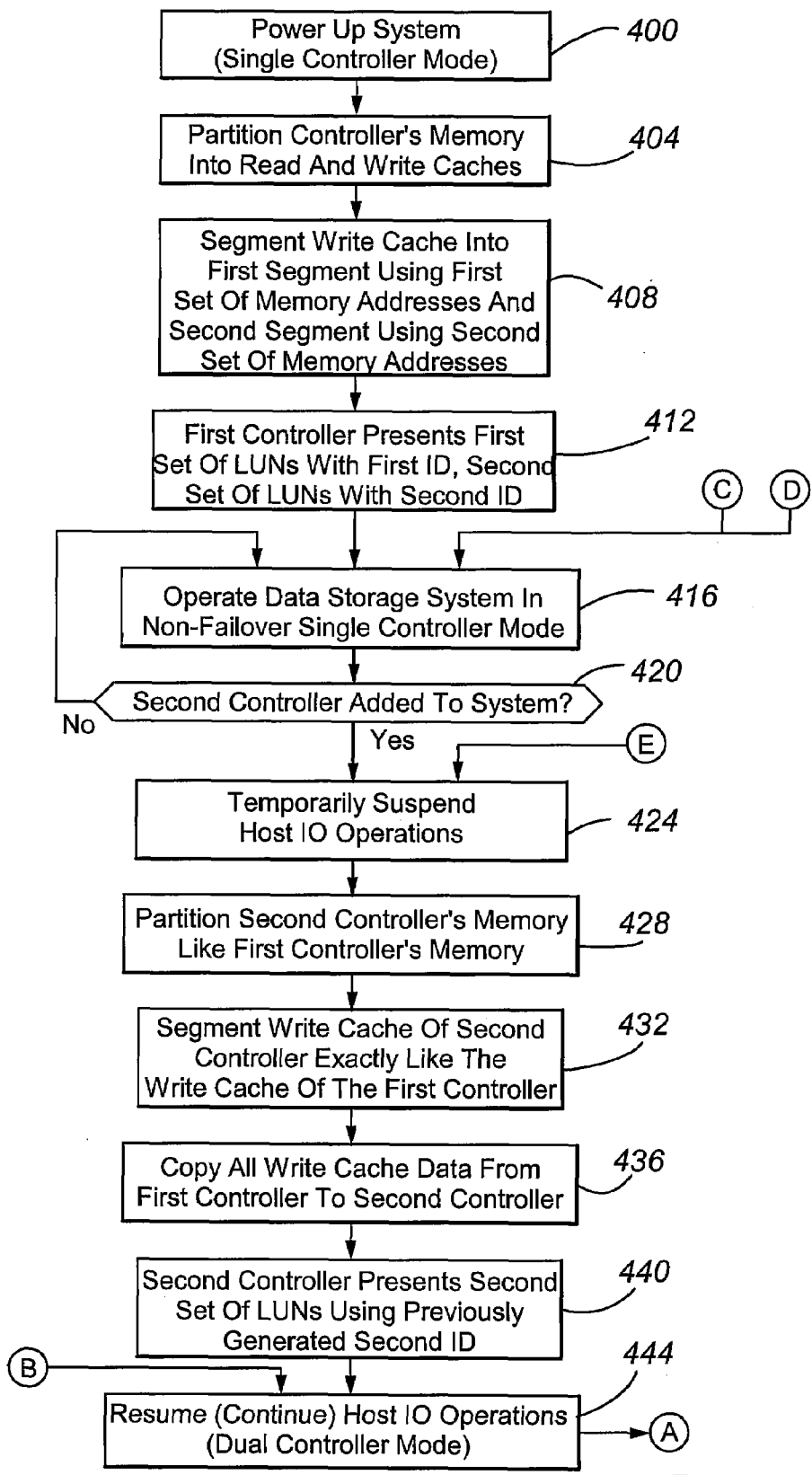
FIGS. 4A and B are flowcharts depicting aspects of the operation of a data storage system in accordance with embodiments of the present invention.

With reference now to FIG. 4A, aspects of the operation of a data storage system 104 incorporating at least one controller 212 in accordance with embodiments of the present invention are illustrated. Initially, at step 400, the system is powered up while in a single controller mode. As part of the initialization of the single controller 212a, that controller's 212a memory 308 is partitioned into a write cache 312 and a separate read cache 316 (step 404). In addition, the write cache 312 is segmented into a first region or segment 320 that uses a first set of memory addresses associated with a first identifier (ID) and with a first set or group of LUNs, and a second region or segment 324 that uses a second set of addresses associated with a second ID and with a second set or group of LUNs (step 408). Furthermore, the first set of LUNs will be associated with metadata indicating that those LUNs are owned by the first controller 212a. The second set of LUNs will be associated with metadata indicating that the first controller 212a does not own those LUNs. Moreover, such segmentation of the write cache and such assignments of LUNs are made even though the controller 212a is at least initially in a single controller system.

At step 412, the first controller 212a presents the first set of LUNs in association with the first ID and the second set of LUNs in association with the second ID. As a result, the first controller 212a will receive all host 108 writes for all LUNs. In addition, the first controller 212a is configured such that it will not report that another controller 212 has failed. That is, the first controller 212a will operate as if all LUNs within the data storage system 104 are owned by the first controller 212a. The first controller 212a therefore operates as if it were part of a conventional single controller data storage system, except that the write cache has been segmented, and those segments have been associated with separable sets of LUNs. Furthermore, in single controller mode, the first controller 212a does not attempt to mirror data to any other controller 212. The data storage system 104 may thus operate in a non-failover single controller mode while making use of or having available for use all of the memory 308 configured to act as the write cache 312 (step 416).

At step 420, a determination is made as to whether a second controller 212b has been added to the data storage system 104. If a second controller 212b has not been added, the system may continue to operate in single controller mode.

If a second controller 212b has been added to the data storage system 104, host 10 operations are temporarily suspended (step 424). This may comprise the first controller detecting or being informed of the presence of the second controller 212b, and the first controller 212a taking the LUNs associated with the second ID (i.e., the second set of LUNs) offline. The second controller 212b memory 308 must be partitioned into a write cache partition 312 and a read cache partition 316 like the original or first controller's 212a memory 308 (step 428). Moreover, the write cache partition 312 of the second controller 212b is segmented exactly like the write cache of the original or first controller 212a (step 432). That is, the write cache region 312 is segmented into a first region or segment 320 using a first set of memory addresses associated with the first set of LUNs and a second region or segment 324 using the second set of memory addresses associated with the second set of LUNs. In addition, metadata may be made available to the controllers 212 indicating that the first set of LUNs is owned by or zoned to the first controller 212a, and that the second set of LUNs is owned by or is zoned to the second controller 212b. Such metadata may be communicated to the controllers 212 during a scan of the backend storage devices 204 to read metadata from the storage devices 204 that is performed in response to the addition of the second controller 212b to the data storage system 104.

At step 436, all of the data in the write cache 312 of the first controller 212a is copied to the write cache 312 of the second controller 212b. The second controller 212b then presents the second set of LUNs using the previously generated second ID (step 440). In addition, the second controller 212b may signal to the first controller 212a that the second controller is now primary with respect to the second set of LUNs. Host 10 operations may then resume, with the data storage system 104 now in dual controller mode (step 444). After adding the second controller 212b to the system, the second controller 212b will respond to requests or operations associated with the second set of LUNs, and the host 108 will therefore direct operations associated with the second set of LUNs to the second controller 212b. The first controller 212a may continue to respond to requests or operations associated with the first set of LUNs, and therefore such requests or operations will continue to be directed to the first controller 212a. In addition, in the dual controller mode, write data associated with the first set of LUNs is mirrored by the first controller 212a to the second controller 212b, and write data associated with the second set of LUNs is mirrored by the second controller 212b to the first controller 212a.

Figure 4B:
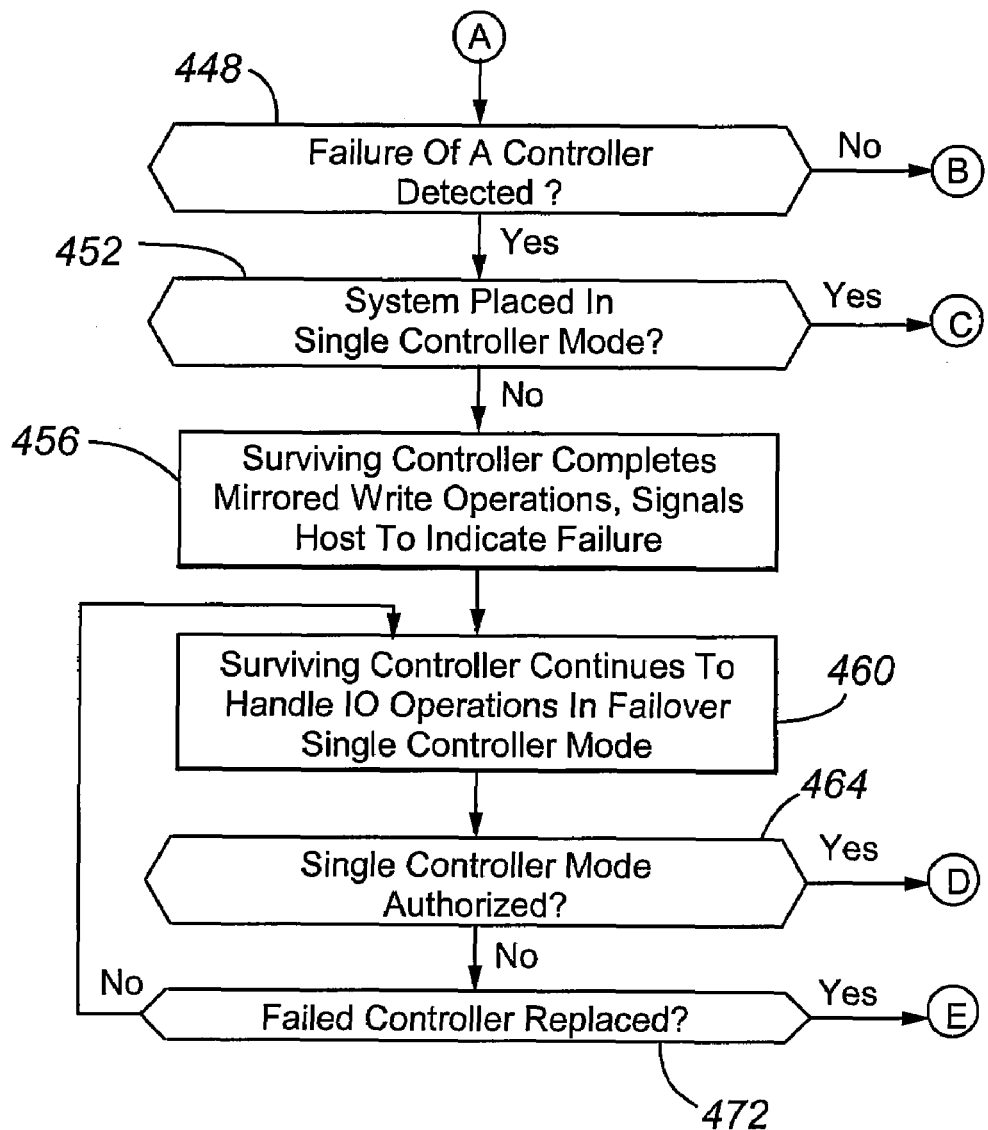

With reference now to FIG. 4B, additional aspects of the operation of a data storage system 104 in accordance with embodiments of the present invention are illustrated. In particular, after resuming host operations at step 444 (FIG. 4A), a determination may be made as to whether a failure of a controller 212 in the data storage system 104 has been detected (step 448). If a failure of a controller 212 has not been detected, the process may return to step 444, and host 10 operations may continue. If a failure of a controller 212 is detected, a determination may next be made as to whether the data storage system 104 has been placed in a single controller mode (step 452). If the system has been placed in a single controller mode, the process may return to step 416 (FIG. 4A) for operation in a non-failover single controller mode. Placing the data storage system 104 in a non-failover single controller mode may be desirable in connection with maintenance operations, for example where a partner controller 212 is being replaced.

If the data storage system 104 has not been placed in a single controller mode, the surviving controller 212 completes the write operations that have been mirrored to the segment of that controller's write cache 312 that has been provided with write cache data from the partner controller 212 prior to failure of that partner controller 212, and the surviving controller 212 provides the host 108 with a signal indicating that a controller 212 has failed (step 456). The surviving controller 212 may then continue to handle host IO operations in a failover single controller mode (step 460). In a failover single controller mode, the surviving controller 212 may continue to provide a signal to the host 108 indicating that the partner controller 212 has failed, and/or a flag indicating such condition may remain set.

At step 464, a determination may be made as to whether a single controller mode 212 has been authorized. For example, the operator or administrator of the data storage system 104 may wish to clear the failure signal and continue operation in single controller mode, for example until a replacement controller 212 can be installed in the data storage system 104. Accordingly, if a single controller mode is authorized, the process may return to step 416 (FIG. 4A). If a single controller mode has not been authorized, a determination may be made as to whether the failed controller has been replaced (step 472). If the failed controller has not been replaced, a surviving controller 212 may continue to handle host IO operations in failover single controller mode (i.e., the process may return to step 460). If the failed controller is replaced, the process may return to step 424 (FIG. 4A), and host 10 operations may be temporarily suspended. The replacement controller 212 may then have its memory partitioned and segmented (steps 428 and 432 of FIG. 4A), and all of the write cache data held by the surviving controller 212 is copied to the replacement controller 212 (step 436 of FIG. 4A). The replacement controller may then present the second set of LUNs using the previously generated second ID (step 440 of FIG. 4A) and host 10 operations may be resumed with the data storage system 104 in dual controller mode (step 444 of FIG. 4A).

From the description provided herein, it can be appreciated that embodiments of the present invention provide a data storage system 104 that can be upgraded from single controller operation to dual controller operation, without requiring a reboot of an existing controller 212. More particularly, embodiments of the present invention provide a controller 212 having a segmented write cache such that a controller 212 operating in a single controller mode can be adapted for dual redundant active-active controller operation, without requiring reconfiguration of the original controller's 212a write cache 312. Furthermore, embodiments of the present invention support single controller operation that can make beneficial use of the entire write cache 312 of the single controller 212, even while being configured to permit conversion to dual controller operation without requiring that the memory 308 be flushed.

As can also be appreciated by one of skill in the art after consideration of the description provided herein, the conversion between single controller operation and a dual controller operation can be performed automatically, without requiring any input by a user, other than interconnecting a second controller 212 to an operating single controller data storage system 104. As can also be appreciated by one of skill in the art, by partitioning the write cache 312 of a controller 212 as described herein, changes to a host system 108 by the user are not required in order to add a second controller 212. More particularly, a host system 108 may detect that the path for data directed to LUNs associated with a second ID and/or otherwise indicated as being owned by or zoned to the second controller 212b has changed after a second controller 212b has been added to a single controller system, but will otherwise be unaffected. Furthermore, from the present invention, it can be appreciated that a controller 212 in accordance with embodiments of the present invention is configured to support a reverse failover type operation to enable conversion of a data storage system 104 from a single controller mode to a dual redundant active-active controller mode, without requiring flushing the write cache 312 of the original controller 212 in the system 104.

Although certain embodiments of the present invention have been described as providing a data storage system 104 in which a first set of LUNs is associated with a first ID and a second set of LUNs is associated with a second ID, other embodiments of the present invention may utilize a single ID. In accordance with such embodiments, a device driver on the host performs a rescan in response to the addition of a second controller 212b to the data storage system 104. By performing the rescan, the host 108 determines the fiber channel worldwide name of the LUNs that have been moved to the second controller. Thereafter, operations associated with LUNs having serial numbers that have remained with the first controller 212a will continue to be directed to the first controller 212a, while operations associated with LUNs owned by the second controller 212b are directed to the second controller 212b.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for caching data that facilitates conversion from single controller to dual storage device array controller operation, comprising:

with respect to a first controller:
partitioning memory included in said first controller into a first partition and a second partition, wherein said first partition is a write cache and said second partition is a read cache, and wherein said first controller is a storage device array controller;
segmenting said write cache into first and second segments;
associating a first set of addresses with said first segment; and
associating a second set of addresses with said second segment;
installing said first controller in a storage system having no storage device array controller other than said first controller; and
operating said first controller in said storage system in a single controller mode, wherein data is written to said first and second segments of said write cache by said first controller, and wherein in said single controller mode said first controller does not report any other controller as missing.

2. The method of claim 1, further comprising:
with respect to a second controller:
partitioning memory included in said second controller into a first partition and a second partition, wherein said first partition is a write cache and said second partition is a read cache, and wherein said second controller is a storage device array controller;
segmenting said write cache of said second controller into first and second segments;
associating said first set of addresses with said first segment of said write cache of said second controller; and
associating said second set of addresses with said second segment of said write cache of said second controller;
installing said second controller in said storage system;
copying data in said write cache of said first controller to said write cache of said second controller; and
operating said first and second controllers in said storage system in a dual controller mode, wherein said first controller responds to operations associated with said first set of addresses and said second controller responds to operations associated with said second set of addresses.

3. The method of claim 2, wherein data is written to said first segment of said write cache of said first controller as a primary copy of said data, wherein data is written to said second segment of said write cache of said second controller as a primary copy of said data, wherein data is mirrored to said second segment of said write cache of said first controller by said second controller, and wherein data is mirrored to said first segment of said write cache of said second controller by said first controller.

4. The method of claim 1, wherein said first set of addresses are associated with at least a first logical unit number (LUN).

5. The method of claim 1, wherein said first set of addresses are associated with a first identifier and wherein said second set of addresses are associated with a second identifier.

6. The method of claim 5, wherein said first identifier is associated with a first set of logical unit numbers (LUNs), and wherein said second identifier is associated with a second set of LUNs.

7. The method of claim 2, further comprising:
reading metadata from a number of storage devices by said first and second controllers.

8. The method of claim 2, wherein said segmenting said write cache of said second controller into first and second segments comprises segmenting said write cache of said second controller exactly like said write cache of said first controller.

9. The method of claim 2, further comprising:
after said operating said first and second controllers in said dual controller mode, detecting a failure of one of said controllers, wherein another of said controllers remains operational;
in response to said detecting a failure of one of said controllers, reporting said failed controller as missing, wherein said operational controller operates in a failover mode.

10. The method of claim 2, wherein said copying data and said operating said first and second controllers comprises performing a reverse failover operation.

11. A storage system, comprising:
a first controller slot;
a second controller slot;
a first controller interconnected to said first controller slot, said first controller including:
memory, wherein said memory is partitioned into read cache and write cache portions, wherein said write cache portion is further segmented into first and second write cache segments, wherein a first set of memory addresses are included in said first write cache segment and are associated with a first identifier, wherein a second set of memory addresses are included in said second write cache segment and are associated with a second identifier, wherein in a first mode of operation said second controller slot is empty, and wherein in said first mode of operation said first controller does not report a missing second controller.

12. The system of claim 11, further comprising:
a number of storage devices, wherein storage devices comprise at least a first array, wherein a number of array partitions are established on said at least a first array, and wherein in a single controller mode said first controller responds to requests associated with all of said array partitions.

13. The system of claim 12, wherein each of said array partitions comprises a different logical unit number (LUN).

14. The system of claim 11, further comprising:
a second controller interconnected to said second controller slot, said second controller including:
memory, wherein said memory is partitioned into read cache and write cache portions, wherein said write cache portion of said memory of said second controller is further segmented into first and second write cache segments, and wherein said first set of memory addresses are included in said first write cache segment of said second controller and said second set of memory addresses are included in said second write cache segment of said second controller;
wherein in a dual controller mode said first write cache portion of said memory of said first controller is a primary write cache portion, said first write cache portion of said memory of said second controller is a mirror write cache portion, said second write cache portion of said first controller is a mirror write cache portion, and said second write cache portion of said second controller is a primary write cache portion.

15. The system of claim 14, further comprising:
a host; and
a communication channel interconnecting said host to said first and second controllers, wherein in said single controller mode host requests associated with any of said memory addresses are responded to by said first controller, and wherein in said dual controller mode host requests associated with said first set of memory addresses are responded to by said first controller and host requests associated with said second set of memory addresses are responded to by said second controller.

16. The system of claim 14, wherein a configuration of said write cache portion of said first controller is identical to a configuration of said write cache portion of said second controller.

17. The system of claim 14, further comprising:
a plurality of storage devices, wherein a plurality of array partitions are established on said plurality of storage devices.

18. The system of claim 17, wherein a first set of said array partitions comprising a first set of logical unit numbers (LUNs) are associated with said first identifier, and wherein a second set of said array partitions comprising a second set of logical unit numbers are associated with said second identifier.

19. The system of claim 17, further comprising:
metadata stored on at least some of said plurality of storage devices, wherein said metadata indicates a relationship between said first and second controllers and said first and second identifiers.

20. A data storage system, comprising:
means for requesting input/output (IO) operations;
first means for controlling data IO operations including means for caching write data having at least first and second segments, wherein said first segment is associated with a first set of logical unit numbers (LUNs) and said second segment is associated with a second set of LUNs; and
a plurality of means for storing data in communication with said first means for controlling data IO operations, wherein in a first mode of operation of said data storage system only said first means is included in said data storage system, wherein said first means for controlling data IO operations handles all write requests received from said means for generating write requests using both said first segment and said second segment of said means for caching write data of said first means for controlling data IO operations, wherein in said first mode of operation said first means for controlling data IO operations employs the first segment in association with the first set of LUNs and the second segment in association with the second set of LUNs, and wherein said first means for controlling data IO operations does not signal said means for generating write requests that another means for controlling data IO operations is missing.

21. The system of claim 20, further comprising:
second means for controlling data IO operations including means for caching write data having at least first and second segments, wherein said first segment is associated with a first set of logical unit numbers (LUNs) and said second segment is associated with a second set of LUNs, wherein said second means for controlling data IO operations is in communication with said plurality of means for storing data, wherein in a second mode of operation said first and second means for controlling data IO operations are operational, wherein said first means for controlling data IO operations responds to said means for generating write requests in connection with write requests from said means for generating write requests associated with said first set of LUNs, and wherein said second means for controlling data IO operations responds to said means for generating write requests in connection with write requests from said means for generating write requests associated with said second set of LUNs.

22. The system of claim 21, wherein said second mode of operation is entered into after said first mode of operation.

23. The system of claim 21, wherein in said second mode of operation said first means for controlling data IO operations mirrors write requests associated with said first set of LUNs to said second means for controlling data IO operations and said second means for controlling data IO operations mirrors write requests associated with said second set of LUNs to said first means for controlling data IO operations.

24. The system of claim 21, wherein said means for caching data of said first and second means for controlling data IO operations are identical.

25. The method of claim 2, wherein installing said second controller in said storage system is performed without requiring said storage system to be rebooted.

* * * * *